Patented June 28, 1938

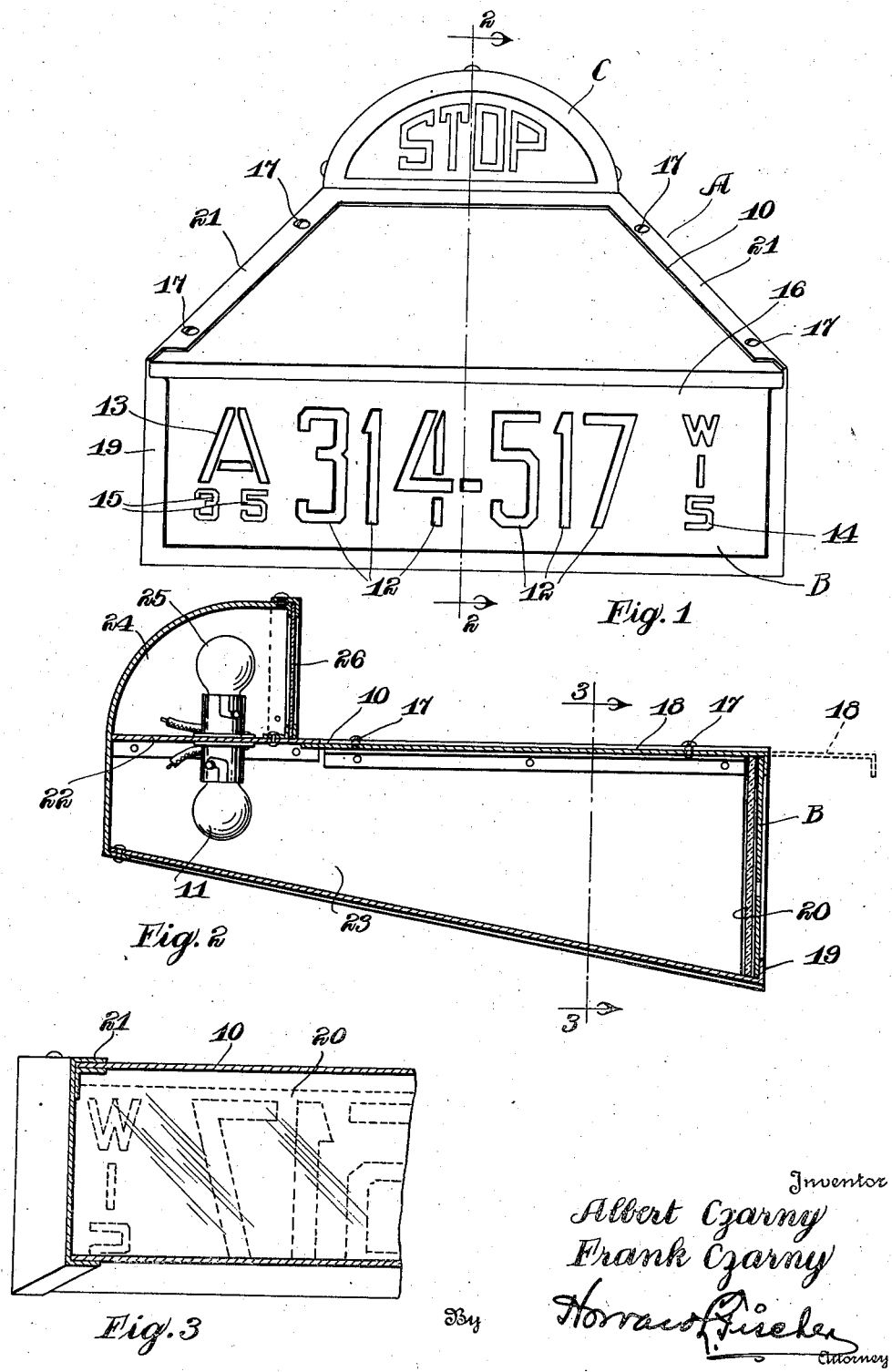

2,122,027

UNITED STATES PATENT OFFICE 2,122,027

ILLUMINATED LICENSE PLATE TAILLIGHT

Albert Czarny and Frank Czarny, St. Paul, Minn.

Application May 21, 1935, Serial No. 22,552

3 Claims. (Cl. 40—133)

Our illuminated license tail light includes a light compartment which is adapted to support an electric light globe so as to reflect the light from the same through the license plate, thereby illuminating the same so that the license plate may be clearly visible at night as well as during the day.

A feature resides in providing a support for a license plate which is adapted to confine and direct light from an electric bulb to the license plate. The support provides a place for the license plate. The license plate is stencilled out with an opaque background so that the light may pass through the figures and letters of the same. Thus the license number and figures and letters on the license plate will show up very clearly at night.

A further feature is in providing a license plate in which the figures and letters are stencilled out and wherein the background is opaque and of any suitable color, and in associating with the stencilled out license plate a colored glass or colored translucent member, such as cellophane, celluloid, or any translucent colored material, so as to provide a contrast of color between the background color of the license plate and the stencilled out configuration or display which is adapted to appear on the license plate. By this means the license plate may be clearly visible during the daylight without the aid of the electric light. Thus it is only necessary that the electric light in our illuminated license tail light be turned on at night if it is desired not to illuminate the license plate during the day.

A further feature of our illuminated license tail light resides in providing a stop light in conjunction therewith and which is adapted to act as a part of the tail light and support.

The features and details will be more fully and clearly defined.

In the drawing forming part of the specification:

Figure 1 is a perspective rear view of our illuminated license tail light.

Figure 2 is a side sectional view of the same, and

Figure 3 is a section on the line 3—3 of Figure 2.

The drawing illustrates our illuminated license plate tail light A which includes the housing 10 in which the electric light 11 is positioned. The housing 10 is adapted to extend from the light 11 rearwardly and is enlarged sufficiently to receive the stencilled license plate B.

The license plate B is cut out to form the numerals 12 for the number of the license and is also cut out to show the letter "A" or other suitable alphabetical letter 13 to designate the class of the license. Further, the license plate B is stencilled out to designate the State by the letters or indicia 14 and is stencilled out with the numerals 15 to indicate the year for which the license is issued. The background 16 surrounding the numerals, letters and indica displayed in the body of the license plate B by stencilling out a portion of the same, is preferably colored such as black, or any other suitable color.

The license plate B is adapted to be secured in the end of the housing 10 by loosening the screws 17 which are positioned along the top of the frame of the housing 10 so that the upper plate 18 may be slid out as illustrated in dotted lines, and then the license plate B may be slipped into the housing back of the marginal flange 19 which extends along the bottom and up the sides of the same. A colored glass member 20 is spaced from the marginal flanges 19 and is held in a suitable manner in the rear end of the frame 10 so as to form a slot between the marginal flanges 19 and the glass 20 into which the stencilled license plate B may be inserted. After the license plate B is in place, the top 18 may be slid back under the flanges 21 and the screws 17 may then be replaced so as to fix the top plate 18 in position so that the license plate B will be held firmly in place and virtually bearing against the colored glass 20.

It is preferred that the colored glass 20 be of a color which will readily contrast with the background color 16 of the license plate B so that the license numbers and indicia will show up in the daytime without the necessity of the electric light 11. It is apparent also that the member 20 may be made of any suitable colored translucent material so that the light from the electric bulb 11 may shine through the numbers of the license plate, thereby illuminating the same at night to make the license number clearly visible. It may be preferred to have the member 20 of a red color so that the license numbers will show up in red and act as an illuminated license plate tail light.

The light 11 is mounted upon the division wall 22 which separates the license plate light compartment 23 from the stop light compartment 24. The stop light compartment 24 is adapted to receive an electric light 25. The compartment 24 may be formed of any suitable shape and we have illustrated the same of an arcuated nature. A translucent colored window 26 is provided to close the rear surface of the stop light compartment.

Thus we provide an illuminated license plate tail light with a stop light portion C projecting above the housing of the illuminated license plate tail light portion as illustrated, which permits the stop light to be clearly visible at all times and which also more clearly illuminates the license number of the motor vehicle. It is very desirable in view of the numerous motor vehicles that are on the highways, that the license plates of the same be clearly visible at night as well as during the day. With our illuminated license plate tail light we accomplish this in a simple manner. The housing for supporting the tencilled license plate may be of any desired shape or design and size so as to accommodate the license plate, and where the license plate is of a smaller nature the ends of the license plate may be opaque. It is also apparent that all of the license plates may be made of a uniform size if it is desired, or that the opening for receiving the license plate may be varied as may be desired.

In accordance with the patent statutes we have described the principles of our illuminated license plate tail light, and we have endeavored to illustrate one embodiment thereof as defined by the foregoing specifications and the drawing, however, we desire to have it understood that the same may be varied within the scope of the following claims:

We claim:

1. A license plate including a casing having an open side and an open top, said casing being tapered in such a manner that the open top is substantially wider adjacent said open side than at the opposite side thereof, translucent means in said open side for providing an illuminated license display, inwardly extending flanges along the tapered sides of said casing and tapered top closure means slidably secured beneath said flanges of said casing, said top closure wedging into closed position, and quickly slidable into open position entirely disengaging from said casing when pulled out a fraction of the length thereof.

2. A combined stop and tail light including a casing comprising a pair of sides tapered together toward one end, a bottom connecting said sides, a rear wall extending upwardly from said bottom and projecting above said sides to form a stop light casing, a top for said casing extending over a portion of the length of said casing, and cut away centrally to provide a top opening to said casing, said top providing a bottom wall for said stop light compartment, a removable cover for said opening in said top, a translucent plate, a died out license plate, and means securing said translucent and license plate extending over the end of said casing opposite said end wall forming said stop signal compartment, and means in said stop light compartment and said license tail light compartment for illuminating said stop light and tail light compartments.

3. A combined stop and tail light comprising a tail light license compartment including side walls, bottom wall, one end wall, and a top having an opening therein, one end of said tail light compartment remaining open, a license plate having openings therethrough, a colored transparent sheet adjacent said license plate means for securing said license plate and colored transparent sheet in said open end of said tail light compartment, said end wall extending above said side walls and shaped to form a stop light compartment, a top closure for said top opening external of said stop light compartment, an open end on said stop light compartment, colored translucent means secured in said open end, and illuminating means in said stop light compartment and in said tail light compartment.

ALBERT CZARNY.
FRANK CZARNY.